Aug. 26, 1930.  A. NÄTTCHER ET AL  1,773,840
APPARATUS FOR REMOVING SUSPENDED MATERIAL FROM GASES
Filed May 17, 1927   2 Sheets-Sheet 2
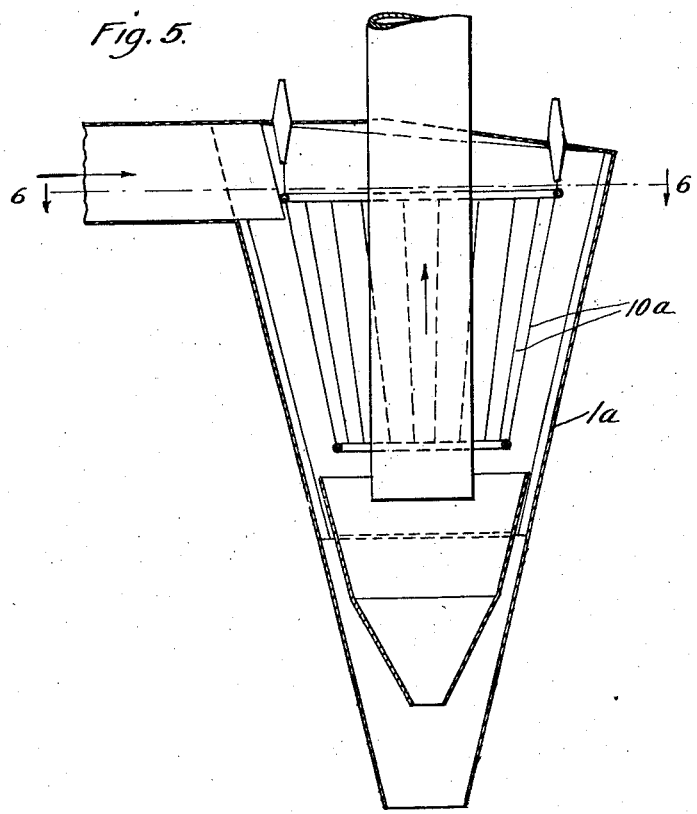
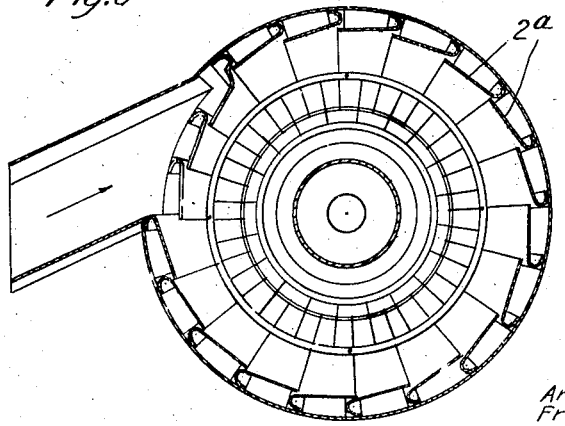
INVENTORS
Arno Nättcher
Franz Seipp
BY
ATTORNEYS.

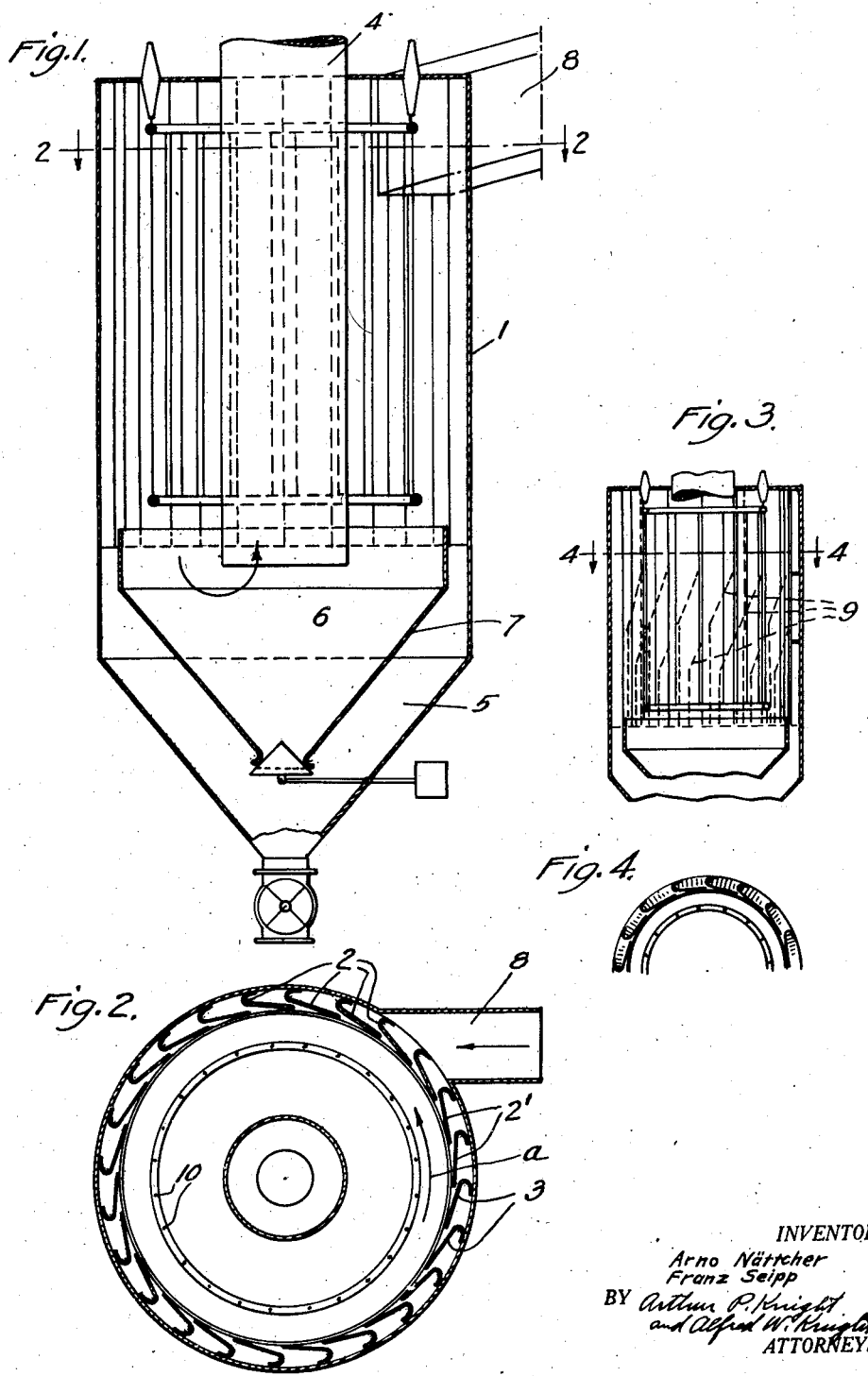
Aug. 26, 1930. A. NÄTTCHER ET AL 1,773,840
APPARATUS FOR REMOVING SUSPENDED MATERIAL FROM GASES
Filed May 17, 1927 2 Sheets-Sheet 1
INVENTORS
Arno Nättcher
Franz Seipp
BY
ATTORNEYS.

Patented Aug. 26, 1930

1,773,840

UNITED STATES PATENT OFFICE

ARNO NÄTTCHER AND FRANZ SEIPP, OF FRANKFORT-ON-THE-MAIN, GERMANY, ASSIGNORS TO INTERNATIONAL PRECIPITATION COMPANY, OF LOS ANGELES, CALIFORNIA, A CORPORATION OF CALIFORNIA

APPARATUS FOR REMOVING SUSPENDED MATERIAL FROM GASES

Application filed May 17, 1927, Serial No. 192,090, and in Germany June 30, 1926.

This invention relates to apparatus for removing suspended material from gases by the combined action of electrical and mechanical means acting simultaneously and in a single apparatus.

The principal object of the invention is to provide for more effective and economical removal of certain classes of suspended material than can be obtained by either electrical or mechanical means alone.

A further object of the invention is to cause the suspended particles to be separated from the gases by the combined and simultaneous action of centrifugal force due to the whirling motion of the gases and of electrical action due to a high potential electrical field.

A further object of the invention is to so form the collecting members or surfaces as to provide pockets or channels which are substantially removed from the electrical field and also from the whirling gas stream, and into which the collected material may pass and hence fall to the bottom of the apparatus. By means of such an arrangement the liability of the precipitated material being again picked up and carried away by the gas stream is reduced to a minimum.

The apparatus of this invention comprises essentially a cyclone separating chamber or housing of any usual or well known type provided with tangential inlet means and central outlet means for passing gas therethrough with a cyclonic motion, but provided with a plurality of channel forming or pocket forming members distributed around the circumference of said chamber and extending alongside the path of the gas therethrough and transversely to the direction of cyclonic motion thereof, said channel forming members preferably having portions extending substantially tangentially with respect to said chamber so as to form collecting surfaces, and preferably overlapping one another while leaving slots or openings between adjacent members through which the precipitated material may pass into the channels or pockets formed thereby. The apparatus further comprises discharge electrode means mounted within said chamber and spaced and insulated from said collecting surfaces, in such manner that a high potential difference may be maintained between said discharge electrodes and said collecting surfaces.

The accompanying drawings illustrate embodiments of this invention and referring thereto:

Fig. 1 is a vertical section of one form of such apparatus.

Fig. 2 is a horizontal section on line 2—2 in Fig. 1.

Fig. 3 is a partial vertical section of a modified form of apparatus.

Fig. 4 is a partial horizontal section on line 4—4 in Fig. 3.

Fig. 5 is a vertical section of another form of apparatus.

Fig. 6 is a horizontal section on line 6—6 in Fig. 5.

The apparatus shown in Figs. 1 and 2 comprises a cyclone separating chamber 1 of cylindrical shape, provided with vertical channel forming members 2 mounted interiorly of the wall of said chamber. Said channel forming members have portions 2' which extend substantially tangentially with respect to cylindrical chamber 1, and constitute collecting electrode means, but are slightly inclined outwardly and overlap one another so as to provide openings 3 therebetween, said openings being directed toward the gas stream, that is toward the direction from which the gas approaches said openings in its whirling motion within the chamber.

Gas inlet pipe 8 enters the separating chamber substantially tangentially near the upper end thereof, it being understood that the channel forming members are omitted from in front of said inlet pipe as shown. A cylindrical outlet pipe 4 extends centrally of said cylindrical chamber from a point near the bottom thereof upwardly through the top of said chamber.

The channel forming members 2 open at their lower ends into a special collecting chamber 5, which is of conical shape and is separated from the main chamber 6 by means of a conical separating wall 7, the interior of which may also act as a collecting chamber as hereinafter described. Any suitable means may be provided for removing collected material from chamber 5 and also from the space within wall 7.

In the space between outlet pipe 4 and the collecting surfaces 2', discharge electrodes such as fine wires or rods 10 are placed, said discharge electrodes being supported and insulated in any suitable manner, for example as shown. Said discharge electrodes are preferably spaced further from outlet pipe 4 than from the collecting surfaces 2', in such manner that the electrical field will be substantially wholly between the discharge electrodes and said collecting surfaces and will therefore act upon the suspended particles in the same direction as the centrifugal force due to whirling motion of the gases. The respective discharge electrodes 10 are opposite the tangential faces 2' of the collecting electrodes thereby providing for most efficient action on such collecting electrodes and avoiding difficulties which would arise from reverse ionization or back discharge in case the discharge electrodes were opposite the edges of the collecting electrode members.

Any suitable means may be used for maintaining a high potential difference between the discharge electrode means and the collecting electrode means. For this purpose the discharge members may be connected to a suitable source of high potential current, either alternating or unidirectional, but preferably rectified alternating current of suitable voltage, say from 15,000 to 100,000 volts, the collecting electrodes and the other side of such source of current being connected together or grounded to complete the circuit.

As may be seen, dust or other suspended particles entering through inlet 8 with the gases are caused to pass downwardly through the separating chamber with a whirling or cyclonic motion as indicated by the arrow at $a$ in Fig. 2. The suspended particles are therefore forced or thrown outwardly both by the centrifugal force resulting from such whirling motion and by the well-known action of the electrical field between discharge electrodes 10 and collecting electrodes 2', the forces due to both these actions being exerted simultaneously on the particles of suspended material and tending to drive the particles in the same direction, namely, outwardly toward the collecting electrode surfaces. The material thus precipitated on the surfaces 2' is caused to pass by the frictional effect of the whirling gas stream, through openings 3 into the vertically extending channels between the members 2 and the outer wall 1 of the apparatus. The material then falls freely into collecting chamber 5 and it will be seen that once the material has entered the channels above described it is substantially removed from the electrical field and also from the whirling gas stream and therefore is substantially prevented from reentering such gas stream. The channel members 2 are made of such cross-section and especially of such depth that a sufficient gas pressure is produced at the entrances to said channels to prevent the precipitated material from passing out again into the gas stream.

As shown in Figs. 3 and 4 it is sometimes advantageous to divide the channels by means of divisions or walls 9, in such manner that the material entering the upper portion of each channel is conducted separately from the material entering lower portions thereof. This prevents undue concentration of dust or suspended particles in the channels adjacent the lower portions of openings 3, so that conditions are maintained more nearly uniform throughout the apparatus. The slots or openings 3 may be narrower or shorter at the lower portions of the channel forming members or may be otherwise varied in shape so as to further promote uniform conditions throughout. The other parts of the apparatus may be substantially the same as shown in Figs. 1 and 2.

In the form of the apparatus shown in Figs. 5 and 6 the housing 1ª is of conical shape. The arrangement of the channel forming members 2ª is substantially the same as before except that said members diminish in size toward their lower ends so as to conform to the conical shape of the housing. The remaining portions of the apparatus may again be substantially the same as in Figs. 1 and 2, with the further exception, however, that the discharge electrodes 10ª are also arranged in conical shape so as to maintain a substantially equal distance between said discharge electrodes and the collecting surfaces of the channel members. This construction has the advantage that the gas in its downward passage increases in velocity and the dust particles or other suspended particles are therefore thrown with increased force outwardly and into the channels. A further advantage is that the strength or intensity of the electrical field increases toward the bottom due to the closer spacing of the discharge electrodes. Both the mechanical and electrical precipitating actions therefore increase as the gas passes through the apparatus, tending to precipitate finer and finer particles of suspended material therefrom.

The channel forming members 2 and 2ª may be formed of metal, such as steel or iron, or of any other suitable material possessing sufficient electrical conductivity for the purposes of electrical precipitation, combined with sufficient mechanical strength.

We claim:

1. An apparatus for separating suspended material from gases comprising a housing, provided with a tangential inlet and with a central outlet and defining a passageway adapted to cause gas to flow therethrough with a cyclonic motion, a plurality of channel forming members within said housing and extending circumferentially around and alongside the path of the gas through said passageway and transversely to the direction of cyclonic motion of such gas, said channel forming members having portions constituting collecting electrode means, and discharge electrode means spaced from said collecting electrode means and extending substantially parallel to and opposite the said collecting electrode means and exposed to the gas passing in cyclonic manner in said passageway in such manner as to develop an electrical field in the gas so passing, and to thereby produce by electrical action forces active on the particles in the same direction as the forces due to centrifugal action.

2. An apparatus for separating suspended material from gases comprising a housing, provided with a tangential inlet and with a central outlet and defining a passageway adapted to cause gas to flow through said housing with a cyclonic motion, a plurality of channel forming members within said housing and extending circumferentially around and alongside the path of the gas through said passageway and transversely to the direction of cyclonic motion thereof, said channel forming members having portions extending substantially tangentially to said cyclonic motion so as to constitute collecting electrode means and said members being so shaped and arranged as to present openings between adjacent members, and discharge electrode means spaced from said collecting electrode means and extending substantially parallel to and opposite the said collecting electrode means and exposed to the gas passing in cyclonic manner in said passageway in such manner as to develop an electrical field in the gas so passing, and to thereby produce by electrical action forces active on the particles in the same direction as the forces due to centrifugal action.

3. An apparatus as set forth in claim 2, said openings between the channel forming members being directed toward the direction from which the gas approaches said openings in its cyclonic motion.

4. An apparatus for separating suspended material from gases, comprising a cyclone separating chamber having a vertical axis and provided with tangential gas inlet means adapted to cause cyclonic motion of the gas through said separating chamber, and with central gas outlet means extending vertically and axially within said chamber, a plurality of channel forming members mounted on the inside of the wall of said chamber and extending in a direction from top to bottom thereof, said channel forming members being so arranged as to leave restricted openings therebetween, and having wall portions extending substantially tangentially with respect to the cyclonic motion of the gas in said chamber and constituting collecting electrode means, and discharge electrodes spaced inwardly from and respectively opposite and parallel to said tangential wall portions of the respective channel forming members.

5. An apparatus as set forth in claim 4, said chamber being conical in shape and converging downwardly, and said channel forming members and discharge electrode means being arranged to conform to such shape.

6. An apparatus as set forth in claim 4, and comprising in addition a wall separating the lower portion of said chamber from the main portion thereof, said channel forming members opening at their lower ends into said separated lower portion.

7. An apparatus as set forth in claim 4, said openings between adjacent channel forming members being directed toward the direction from which the gas passed in cyclonic manner through said chamber approaches said openings.

In testimony whereof we have hereunto subscribed our names this 22d day of April, 1927.

ARNO NÄTTCHER.
FRANZ SEIPP.